United States Patent [19]
Robicci

[11] Patent Number: 4,469,745
[45] Date of Patent: Sep. 4, 1984

[54] CAMOUFLAGE COVERING FOR SNOWY SOILS

[75] Inventor: Pier L. Robicci, Milan, Italy

[73] Assignee: Industrie Pirelli S.p.A., Milan, Italy

[21] Appl. No.: 505,443

[22] Filed: Jun. 17, 1983

[30] Foreign Application Priority Data

Jun. 24, 1982 [IT] Italy ............................... 22037 A/82

[51] Int. Cl.³ ............................................... F41H 3/00
[52] U.S. Cl. .................................. 428/283; 428/323; 428/919
[58] Field of Search ............... 428/919, 411, 283, 323, 428/331

[56] References Cited

U.S. PATENT DOCUMENTS

| | | | |
|---|---|---|---|
| 2,771,388 | 11/1956 | Rocky et al. | 156/242 |
| 3,119,729 | 1/1964 | Ljungbo | 428/919 X |
| 4,065,889 | 1/1978 | Fraioli | 160/DIG. 7 |
| 4,347,284 | 8/1982 | Tsutomu et al. | 428/919 X |

OTHER PUBLICATIONS

Mark's Encyclopedia of Polymer Science and Technology, vol. 2, 1965, pp. 762–765, the title page and copyright page, John Wiley & Sons, Inc.

*Primary Examiner*—Henry F. Epstein
*Attorney, Agent, or Firm*—Stevens, Davis, Miller & Mosher

[57] ABSTRACT

A camouflage covering for snowy soils is constituted by a sheet of a polar polymer containing a filler based on titanium salts, silicates or silicon dioxide, either alone or mixed together.

7 Claims, No Drawings

CAMOUFLAGE COVERING FOR SNOWY SOILS

DESCRIPTION

The present invention relates to a camouflage covering for snowy soils and, in particular, at least to a cloth or sheet of flexible material adapted to cover motor vehicles, arms, and the like to impede the visual observation and the photographic observation thereof in the presence of snow on the soil.

While the problem of the visual camouflage of motor vehicles, arms and the like is practically solved, since it is sufficient to resort to the use of coverings formed by sheets of such colors as to make them liable to be confusing to the sight in snowy soils, the problem of camouflage with respect to photographic observation on snowy soils, and more precisely photographic observation on snowy soils through ultraviolet radiation-sensitive films, remains unsolved.

In fact, the photographic observation on snowy soils is made by taking advantage of the specific property of the snow of considerably reflecting the ultraviolet radiations, and more particularly the ultraviolet radiations having wave lengths in the interval between 320 and 400 nano-meters. Owing to the characteristic of the snow just mentioned, which differs in this respect from all other bodies and surfaces existing in nature, the photographic observation is made through ultraviolet radiation-sensitive films.

Another unsolved problem in the camouflage coverings for snowy soils is the problem connected with the very low temperatures linked to the presence of snow, these temperatures tending to stiffen and to make fragile all the materials and, in particular, the camouflage sheets or the camouflage coverings.

The known camouflage sheets for snowy soils are able, with great difficulties, to satisfy the need for providing reflections to the ultraviolet radiations, and in particular the ultraviolet radiations of wave length between 320 and 400 nano-meters, equal to that of the snow.

In order to obtain in the known camouflage sheets for snowy soils the property just-mentioned, recourse is had to considerable quantities of fillers based on lead carbonate in the polymeric material constituting the camouflage sheet itself.

The use of lead carbonate in great quantities in the polymeric material of the camouflage sheet, even though it permits obtaining camouflage coverings having reflections to the ultraviolet radiations fairly near those of a cloak of snow, confers an instability with the passage of time, especially in the presence of atmosphere polluted, for instance, with sulphur and its derivatives, to the characteristic of reflecting the ultraviolet radiations of wave lengths in the interval mentioned above.

This instability with time, by the known camouflage sheets, of the property of reflecting ultraviolet radiations is due to the fact that the lead carbonate, in the presence of an atmosphere polluted for instance with sulphur and its derivatives, tends to react with said polluting substances and to change into other salts, as for instance lead sulphide which, among other things, is not white.

The consequence is that the known camouflage sheets lose in time not only the property of satisfying the requirements for photogenic camouflage, but they also lose their effectiveness for camouflaging visual observation.

Another drawback of the known camouflage sheets for snowy soils is their property of becoming stiff at low temperatures which can reach $-50°$ C. Moreover, the known camouflage sheets for snowy soils at said low temperatures become fragile and consequently are subjected to ruptures and tearings.

The negative properties of the known camouflage sheets due to the action of the low temperatures bring about other drawbacks in the known camouflage coverings for snowy soils, such as their difficulty in being installed and their difficulty in being removed from the motor vehicles, arms, and the like.

The aim of the present invention is that of solving the drawbacks of the known camouflage sheets by means of camouflage sheets having a property of reflecting the ultraviolet radiations, especially in the interval of wave lengths between 320 and 400 nano-meters, which is practically equal to that of the snow, and in such a way that said property remains unchanged with time, and thus eliminating the negative problems due to the presence of low temperatures to which the camouflage sheets are subjected as well as having camouflage sheets whose low temperature flexibility remains optimal.

The object of the present invention is a camouflage covering for snowy soils comprising at least a sheet of flexible material characterized in that said sheet of flexible material comprising at least a superficial layer constituted by a compound based on polar polymeric materials contain a filler selected from the class consisting of titanium salts, silicates and silicon dioxide.

In its more general aspects, a camouflage covering for snowy soils according to the present invention comprises at least a sheet of flexible material provided, at least on one of its faces, with a layer constituted by a compound based on polar polymeric materials containing a filler selected from titanium salts, in particular magnesium titanate, silicates, and silicon dioxide, either taken alone or mixed together.

Preferably, again according to its more general aspects, the whole sheet of flexible material according to the invention is constituted by the above material, being a basic polar polymeric material selected from the class consisting of polychloroprene, chlorosulphonated polyethylene, chlorinated polyethylene, halogenated polybutyl, polyurethanes, polyvinyl chloride, epichlorohydrin elastomers, acrylic elastomers, nitrile elastomers, carboxylate elastomers, polycarbonates, and silicone elastomers.

The camouflage covering for snowy soils according to the present invention comprises a sheet constituted by a compound as given below, there being embedded in said sheet a resistant structure in the form of a fabric.

The material constituting the sheet is a material which comprises as basic polymer a polar polymer as specified herein and more precisely a polymer which is polychloroprene, chlorosulphonated polyethylene, chlorinated polyethylene, halogenated polybutyl, polyurethane, polyvinyl chloride, epichlorohydrin elastomer, acrylic elastomer, polycarbonate, nitrile elastomer, carboxylate elastomer, or silicone elastomer.

Another essential element for the formation of the material constituting the sheet is the filler added to the basic polymeric material. Said filler is constituted by titanium salts, in particular magnesium titanate, silicates, and silicon dioxide, either alone or mixed together.

Moreover, for the filler in addition to the above reported components, but only in the case that said components are mixed together, there may be provided also lead white salts as, for instance, lead carbonate and lead phosphate, and, in general, lead salts of white color.

Another essential element according to the present invention is the total quantity of the filler with respect to the quantity of the basic polymer used for the formation of the sheet. In particular, the quantity of the filler must be between 20 and 200 parts by weight with respect to 100 parts by weight of the basic polymer.

The basic polymer is a polar polymer. This term means those polymers for which the barycenter of the positive and negative charges of the various atoms or radicals constituting the macromolecule do not coincide with one another, and therefore the position of the various positive and negative fillers brings about the formation of bipoles in the macromolecule.

Examples of materials particularly suitable for the formation of the sheet follow by which an effective camouflage covering for snowy soils according to the present invention is obtained.

EXAMPLE 1

A mixture having the following formulation was obtained by means of a mixer:

Dimethylpolysiloxane: 100 parts by weight
2,4-dichlorobenzoyl peroxide*: 3 parts by weight
Magnesium titanate: 60 parts by weight
*Curing agent for the dimethylpolysiloxane.

A pair of sheets of this composition was formed via a calendar or a coating machine and said sheets were doubled over a fabric previously interposed between them.

The sheet thus constituted was vulcanized and at the end of the vulcanization an effective camouflage covering according to the present invention was obtained.

EXAMPLE 2

A composition having the following formulation was formed via a mixer:

Dimethylpolysiloxane: 100 parts by weight
2,4-dichlorobenzoyl peroxide*: 3 parts by weight
Silicon dioxide: 10 parts by weight
Magnesium titanate: 60 parts by weight
*Curing agent for the dimethylpolysiloxane.

A pair of sheets was formed by passing the material of this composition through a calender or a coating machine, and said sheets were doubled to a fabric, creating in this way a sheet.

The sheet, obtained in this manner, was vulcanized and at the end of the vulcanization an effective camouflage covering according to the present invention was obtained.

The camouflage coverings for snowy soils, obtained according to the above-reported examples, were experimentally tested to determine their capability of reflecting ultraviolet radiations having wave lengths between 320 and 400 nano-meters, the steadiness in time of their capability for reflecting the ultraviolet radiations in the presence of atmosphere polluted by sulphur and its derived products, and the flexibility of the camouflage coverings at the low temperatures, and particularly at temperatures of the order of −50° C.

The experimental tests thus carried out showed that the capability of reflecting the ultraviolet radiations in the interval of wave lengths between 320 and 400 nanometers is practically equal to that of the snow. Moreover, it was determined that the camouflage coverings according to the present invention, with the passage of time and in the presence of polluted atmosphere and, in particular, pollution by sulphur and its derived products, do not substantially change their properties of reflecting the ultraviolet radiations and that they have a steadiness of heat with respect to visual observation.

As regards the flexibility at the low temperatures, it has been shown that said flexibility remains practically unchanged even at temperatures of −50° C.

Therefore, from the experimental tests carried out, it is possible to state that by the camouflage covering for snowy soils according to the present invention the aimed purposes are attained.

The reasons the aimed purposes are attained by a camouflage covering for snowy soils according to the present invention are not entirely clear, and hence it is possible to state that the obtained results are surprising.

Probably the capability of considerably reflecting the ultraviolet variations in camouflage coverings for snowy soils according to the present invention, is due not only to the filler constituted by the above-reported substances, but also to the presence of the polarities existing in the basic polymer.

On the other hand, and as regards the steadiness with the passage of time of the properties of reflecting the ultraviolet radiations, this can find an explanation in the fact that the materials constituting the filler are practically insensible to the action of substances polluting the atmosphere and, in particular, to sulphur and its derived products.

Finally, as regards the maintenance also at very low temperatures, such as those down to −50° C., of the flexibility of the camouflage coverings for snowy soils according to the present invention, this can be attributed to the material per se, and in particular to the characteristics of the basic polymer constituting said material.

What is claimed is:

1. A flexible camouflage covering adapted for covering objects such as motor vehicles, arms and the like in the presence of snow-covered soils and for impeding visual and photographic observation of said objects, said covering including means for reflecting ultraviolet radiation having a wavelength in the range of 320 to 400 nanometers and maintaining the flexibility of the covering at temperatures as low as −50° C., said means comprising at least a superficial layer of a compound based on a polar polymeric material containing a filler that is stable in a sulphur-containing atmosphere, said filler being selected from the class consisting of titanium salts, silicates and silicon dioxide.

2. A camouflage covering for snowy soils according to claim 1, characterized in that the filler is a mixture of titanium salts, silicates, and silicon dioxide.

3. A camouflage covering for snowy soils according to claim 2, characterized in that in the mixture of titanium salts, silicates and silicon dioxide there is present also a lead salt of white color.

4. A camouflage covering for snowy soils according to any one of claims 1, 2, or 3, characterized in that the titanium salt is magnesium titanate.

5. A camouflage covering for snowy soils according to claim 1, characterized in that the filler is present in a quantity between 20 and 200 parts by weight with respect to 100 parts by weight of the basic polymeric material.

6. A camouflage covering for snowy soils according to claim 1, characterized in that the polar polymeric material constituting the base of the compound is selected from the class consisting of polychloroprene, chlorosulphonated polyethylene, chlorinated polyethylene, halogenated polybutyl, polyurethane, polyvinyl chloride, epichlorohydrin elastomer, acrylic elastomer, polycarbonate, and silicone elastomer.

7. A camouflage covering for snowy soils according to claim 6, further including a resistant insert of fabric embedded in the covering.

* * * * *